US012365176B2

(12) United States Patent
Shiozawa et al.

(10) Patent No.: US 12,365,176 B2
(45) Date of Patent: Jul. 22, 2025

(54) LIQUID EJECTING APPARATUS

(71) Applicant: SEIKO EPSON CORPORATION, Tokyo (JP)

(72) Inventors: Yu Shiozawa, Shiojiri (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 18/176,968

(22) Filed: Mar. 1, 2023

(65) Prior Publication Data

US 2023/0278335 A1 Sep. 7, 2023

(30) Foreign Application Priority Data

Mar. 2, 2022 (JP) ................................ 2022-031657

(51) Int. Cl.
*B41J 2/045* (2006.01)
*B41J 2/14* (2006.01)

(52) U.S. Cl.
CPC ......... *B41J 2/0456* (2013.01); *B41J 2/04581* (2013.01); *B41J 2/14233* (2013.01)

(58) Field of Classification Search
None
See application file for complete search history.

(56) References Cited

U.S. PATENT DOCUMENTS 9,090,059 B1 * 7/2015 Sayama ............... B41J 2/04551
2019/0263112 A1 * 8/2019 Shinkawa ............. B41J 2/0451

FOREIGN PATENT DOCUMENTS

CN 109484029 B * 10/2020 ........... B06B 1/0644
JP 2000-301714 A 10/2000
JP 2019-147363 A 9/2019

OTHER PUBLICATIONS

Nishiwaki, MachineTranslationofCN-109484029-B,2020 (Year: 2020).*

* cited by examiner

*Primary Examiner* — Scott A Richmond
(74) *Attorney, Agent, or Firm* — WORKMAN NYDEGGER

(57) ABSTRACT

A liquid ejecting apparatus includes: a channel substrate having one or more pressure chambers, an absorbing chamber that absorbs vibration of a liquid; a vibration plate that is stacked on the channel substrate; a first piezoelectric element that is provided on a first surface of the vibration plate, which is on a side opposite to a side on which the pressure chamber is present, at a position overlapping the pressure chamber when viewed and that vibrates the vibration plate to apply pressure to the liquid; a second piezoelectric element that is provided on the first surface of the vibration plate at a position overlapping the absorbing chamber and that deforms to absorb the vibration of the liquid propagated from the pressure chamber; and a pressure detecting section that detects, based on an electromotive force of the second piezoelectric element, pressure of the liquid in the absorbing chamber.

11 Claims, 9 Drawing Sheets

LIQUID EJECTING APPARATUS

The present application is based on, and claims priority from JP Application Serial Number 2022-031657, filed Mar. 2, 2022, the disclosure of which is hereby incorporated by reference herein in its entirety.

BACKGROUND

1. Technical Field

The present disclosure relates to a liquid ejecting apparatus.

2. Related Art

JP-A-2019-147363 describes a technique of a liquid ejecting apparatus. In the liquid ejecting apparatus, when a driving signal generation section outputs a driving signal for ink ejection, a piezoelectric element provided in an ejection section is driven. The piezoelectric element is bonded to a vibration plate that closes an upper opening portion of a cavity plate. When the vibration plate is vibrated by driving of the piezoelectric element, ink is ejected from a nozzle communicating with a cavity. Additionally, in the liquid ejecting apparatus, an ejection-abnormality detecting section detects a change in pressure of a liquid in the ejection section, based on a residual vibration signal generated after the piezoelectric element is driven. The residual vibration signal is a signal indicating a change in electromotive force of the piezoelectric element.

In the technique described in JP-A-2019-147363, a switching section performs switching between a state where the ejection section is coupled to the driving signal generation section and a state where the ejection section is coupled to the ejection-abnormality detecting section to perform switching between driving for ink ejection and detection of an abnormality.

In the technique described in JP-A-2019-147363, however, it is difficult to drive the ejection section for ink ejection and detect a change in pressure of the liquid in the ejection section simultaneously.

SUMMARY

According to an aspect of the disclosure, a liquid ejecting apparatus is provided. The liquid ejecting apparatus includes: a channel substrate having one or more pressure chambers that constitute a channel for a liquid, at least one absorbing chamber that is coupled to the pressure chamber, constitutes the channel for the liquid together with the pressure chamber, and absorbs vibration of the liquid propagated from the pressure chamber, and a nozzle that is coupled to the pressure chamber and ejects the liquid; a vibration plate that is stacked on the channel substrate at a position overlapping the pressure chamber and at a position overlapping the absorbing chamber when viewed in a stacking direction; a first piezoelectric element that is provided on a first surface, which is one surface of the vibration plate on a side opposite to a side on which the pressure chamber is present, at a position overlapping the pressure chamber when viewed in the stacking direction and that vibrates the vibration plate to apply pressure to the liquid in the pressure chamber; a second piezoelectric element that is provided on the first surface of the vibration plate at a position overlapping the absorbing chamber when viewed in the stacking direction and that deforms to absorb at least some of the vibration of the liquid propagated from the pressure chamber; and a pressure detecting section that detects, based on an electromotive force of the second piezoelectric element, pressure of the liquid in the absorbing chamber.

DESCRIPTION OF EXEMPLARY EMBODIMENTS

A1. Embodiment 1

Figure 1:
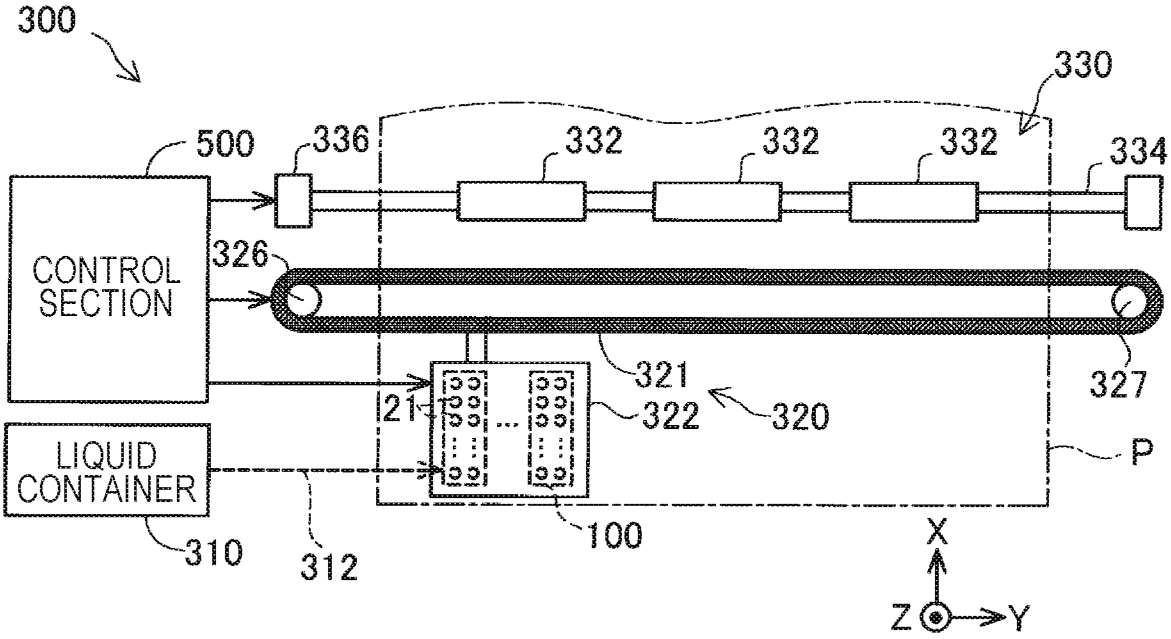
FIG. 1 is a schematic view illustrating an overall configuration of a liquid ejecting apparatus.

FIG. 1 is a schematic view illustrating an overall configuration of a liquid ejecting apparatus 300 that includes a liquid ejecting head 100. In FIG. 1, for ease of understanding, the X-Y-Z orthogonal coordinate system is set. The X-axis and the Y-axis extend along the horizontal plane, and the Z-axis extends along a vertical line. Thus, the −Z-axis direction is the direction of gravity but is not limited thereto depending on a mounting direction of the liquid ejecting apparatus 300. Additionally, in the present specification, “orthogonal” includes the range of 90°±10°.

The liquid ejecting apparatus 300 is an ink jet printer that prints an image on a printing sheet P, which is an example of a medium, by ejecting ink, which is an example of a liquid. Specifically, the liquid ejecting apparatus 300 ejects ink onto the printing sheet P, based on print data indicating on and off of dots on the printing sheet P and forms dots at various positions on the printing sheet P. The liquid ejecting apparatus 300 may use a medium, such as plastic, film, fiber, cloth, leather, metal, glass, wood, or ceramic, as a liquid ejection target instead of the printing sheet P. The liquid ejecting apparatus 300 may eject various coloring materials, electrode materials, living organic material samples, inorganic material samples, lubricant oil, resin liquid, etching solution, or the like instead of ink.

The liquid ejecting apparatus 300 includes the liquid ejecting head 100, a liquid container 310, a head moving mechanism 320, a transport mechanism 330, and a control section 500.

The liquid ejecting head 100 includes a plurality of nozzles 21 that eject a liquid. The liquid ejecting head 100 is mounted on a carriage 322 and is reciprocated mainly in a main-scanning direction together with movement of the carriage 322. While being reciprocated in the main-scanning direction, the liquid ejecting head 100 ejects the liquid, which is supplied from the liquid container 310, onto the printing sheet P transported in a sub-scanning direction. In Embodiment 1, the main-scanning direction corresponds to the +Y direction and the −Y direction. The sub-scanning direction is a direction intersecting the main-scanning direction and corresponds to the +X direction and −X direction. In the illustrated example, the liquid is ejected from the nozzles 21 in the −Z direction.

The liquid container 310 stores the liquid to be ejected from the liquid ejecting head 100. The liquid stored in the liquid container 310 is supplied to the liquid ejecting head 100 through a resin tube 312. Examples of the liquid container 310 include a bag-like liquid package made of a flexible film, a cartridge that is detachably attached to the liquid ejecting apparatus 300, and an ink tank.

The head moving mechanism 320 includes a driving belt 321, the carriage 322, a moving motor 326, and a pulley 327. The carriage 322 has the liquid ejecting head 100 mounted thereon in a state where the liquid ejecting head 100 is able to eject the liquid. The carriage 322 is fixed to the driving belt 321. The driving belt 321 is stretched between the moving motor 326 and the pulley 327. When the moving motor 326 rotationally drives the driving belt 321, the driving belt 321 is reciprocated in the main-scanning direction. As a result, the carriage 322 fixed to the driving belt 321 is also reciprocated in the main-scanning direction.

The transport mechanism 330 transports the printing sheet P in the sub-scanning direction. The transport mechanism 330 includes three transport rollers 332, a transport rod 334 to which the transport rollers 332 are attached, and a transport motor 336 that rotationally drives the transport rod 334. When the transport motor 336 rotationally drives the transport rod 334, the printing sheet P is transported in the sub-scanning direction.

The control section 500 controls the entire liquid ejecting apparatus 300. The function of the control section 500 is achieved by a computer including a processor and memory. For example, the control section 500 controls an operation of reciprocating the carriage 322 in the main-scanning direction, an operation of transporting the printing sheet P in the sub-scanning direction, and an ejecting operation of the liquid ejecting head 100.

Figure 2:
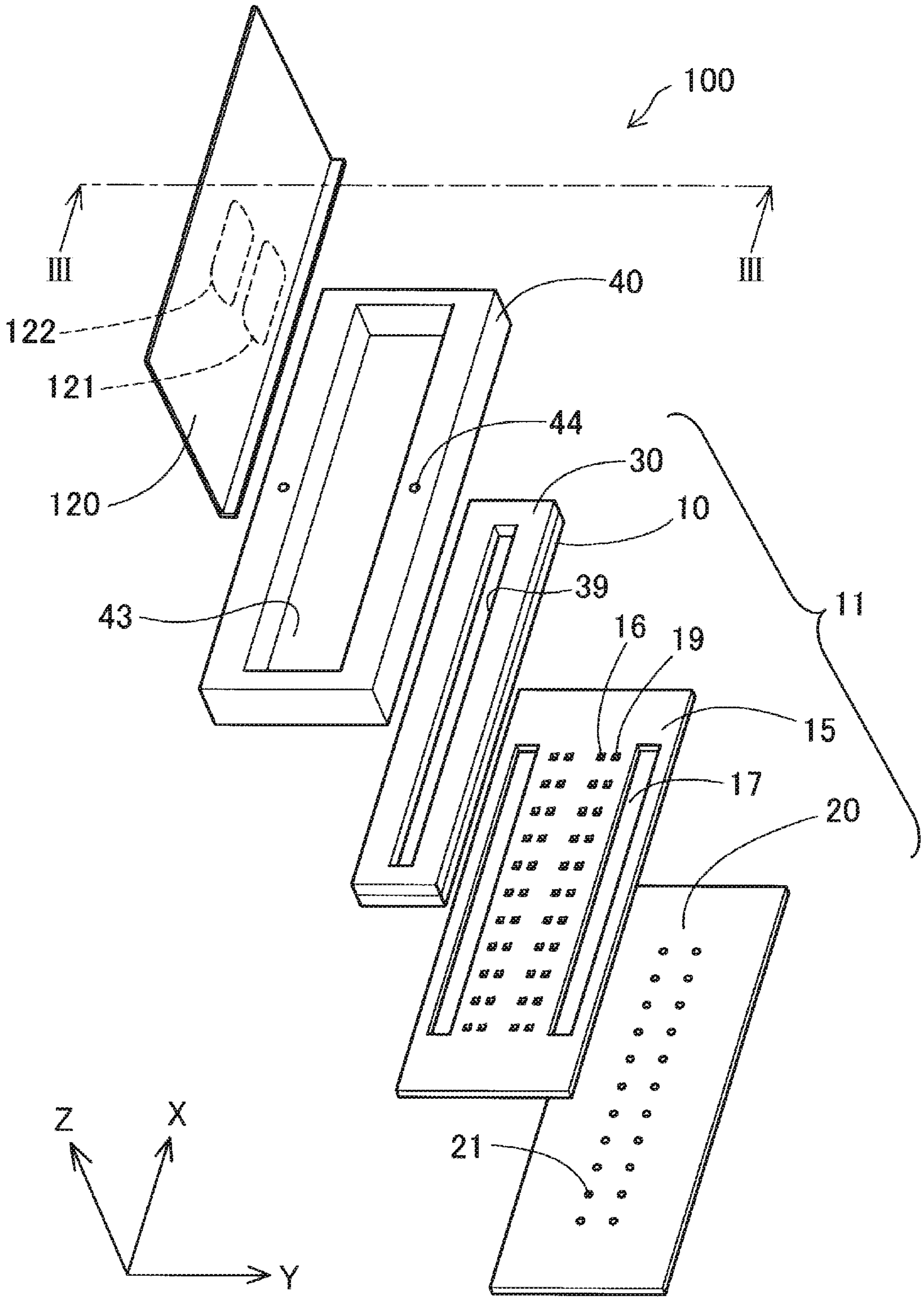
FIG. 2 is an exploded perspective view illustrating a configuration of a liquid ejecting head.
Figure 3:
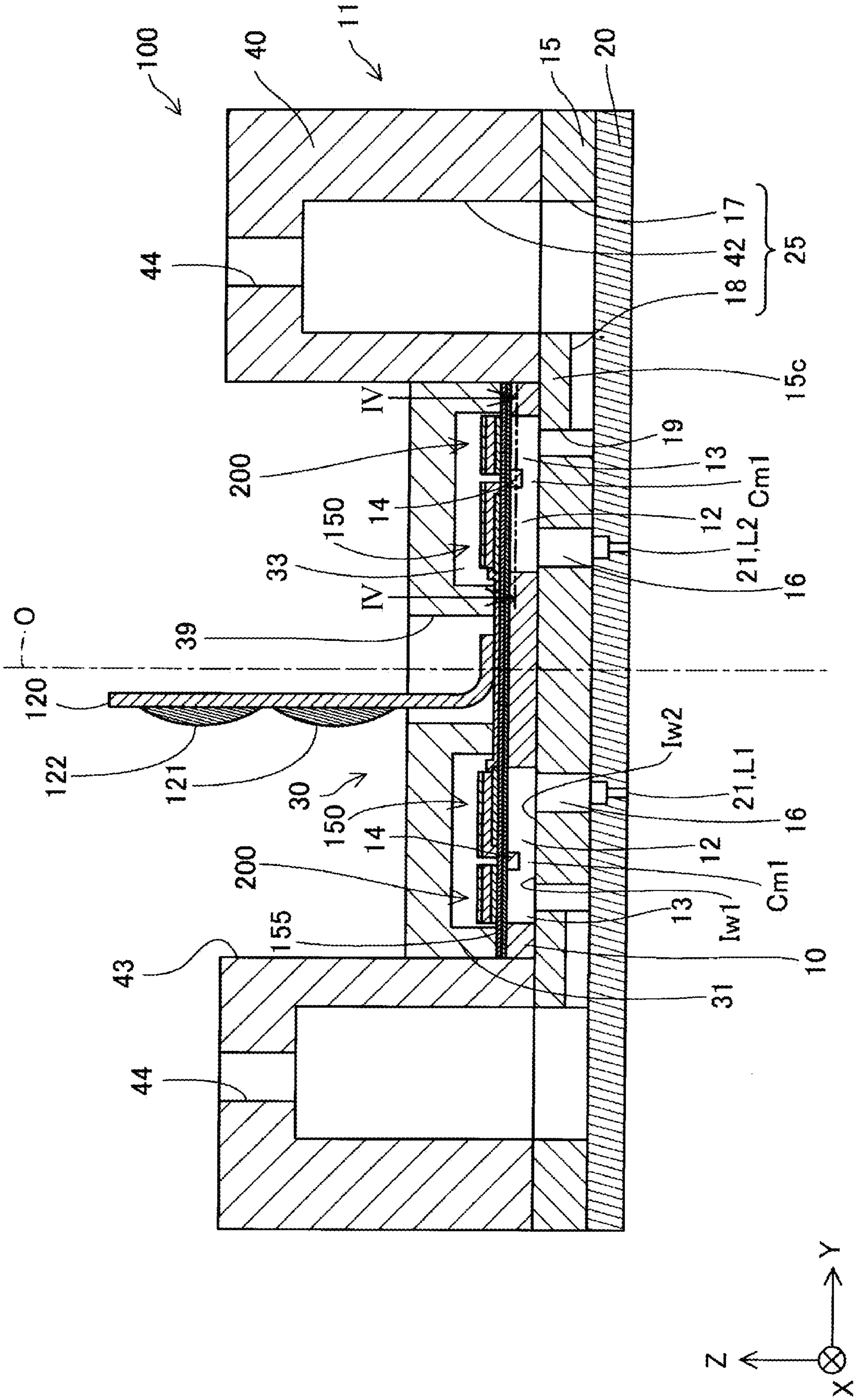
FIG. 3 is a sectional view of the liquid ejecting head along line III-III in FIG. 2.

FIG. 2 is an exploded perspective view illustrating the configuration of the liquid ejecting head 100. FIG. 3 is a sectional view of the liquid ejecting head 100 along line III-III in FIG. 2.

As illustrated in FIG. 2, the liquid ejecting head 100 includes a head main body 11, a case member 40, and a wiring substrate 120. As illustrated in FIG. 3, the head main body 11 and the case member 40 are configured to be symmetric with respect to the center plane O. The center plane O is a plane parallel to the X-axis and the Z-axis and is the XZ plane arranged at a position where a distance from a nozzle row L1 is equal to a distance from a nozzle row L2. The head main body 11 and the case member 40 have the same configuration in the +Y direction and in the −Y direction with respect to the central plane O.

As illustrated in FIG. 2, the head main body 11 includes a pressure chamber substrate 10, a communication substrate 15, a nozzle substrate 20, and a vibrating section 30. The pressure chamber substrate 10, the communication substrate 15, the nozzle substrate 20, and the vibrating section 30 are layer members. The layer members are stacked to form the liquid ejecting head 100. In Embodiment 1, a direction in which the layer members for forming the liquid ejecting head 100 are stacked is also referred to as a stacking direction. In the present embodiment, the stacking direction is the Z-axis direction.

The pressure chamber substrate 10 is fixed to the communication substrate 15 with an adhesive or the like. The pressure chamber substrate 10 is formed of a silicon single-crystal substrate. The pressure chamber substrate 10 may be formed of metal, such as stainless steel (SUS) or nickel (Ni), a ceramic material, such as zirconia ($ZrO_2$) or alumina ($Al_2O_3$), a glass ceramic material, or an oxide material, such as magnesium oxide (MgO) or lanthanum aluminate ($LaAlO_3$).

As illustrated in FIG. 3, a pressure chamber 12, an absorbing chamber 13, and a support section 14 are formed in the pressure chamber substrate 10. The pressure chamber 12 and the absorbing chamber 13 together constitute a portion of a channel for the liquid. The pressure chamber 12 and the absorbing chamber 13 are formed by processing the pressure chamber substrate 10 by anisotropic etching, for example.

The pressure chamber 12 and the absorbing chamber 13 are provided at the same position in the Z-axis direction so as to be adjacent to each other in the Y-axis direction. The support section 14 formed as a portion of the pressure chamber substrate 10 and demarcating the pressure chamber 12 and the absorbing chamber 13 is provided between the pressure chamber 12 and the absorbing chamber 13. The pressure chamber 12 and the absorbing chamber 13 are coupled to each other in the Y-axis direction through a communication channel Cm1 provided under the support section 14.

Figure 4:
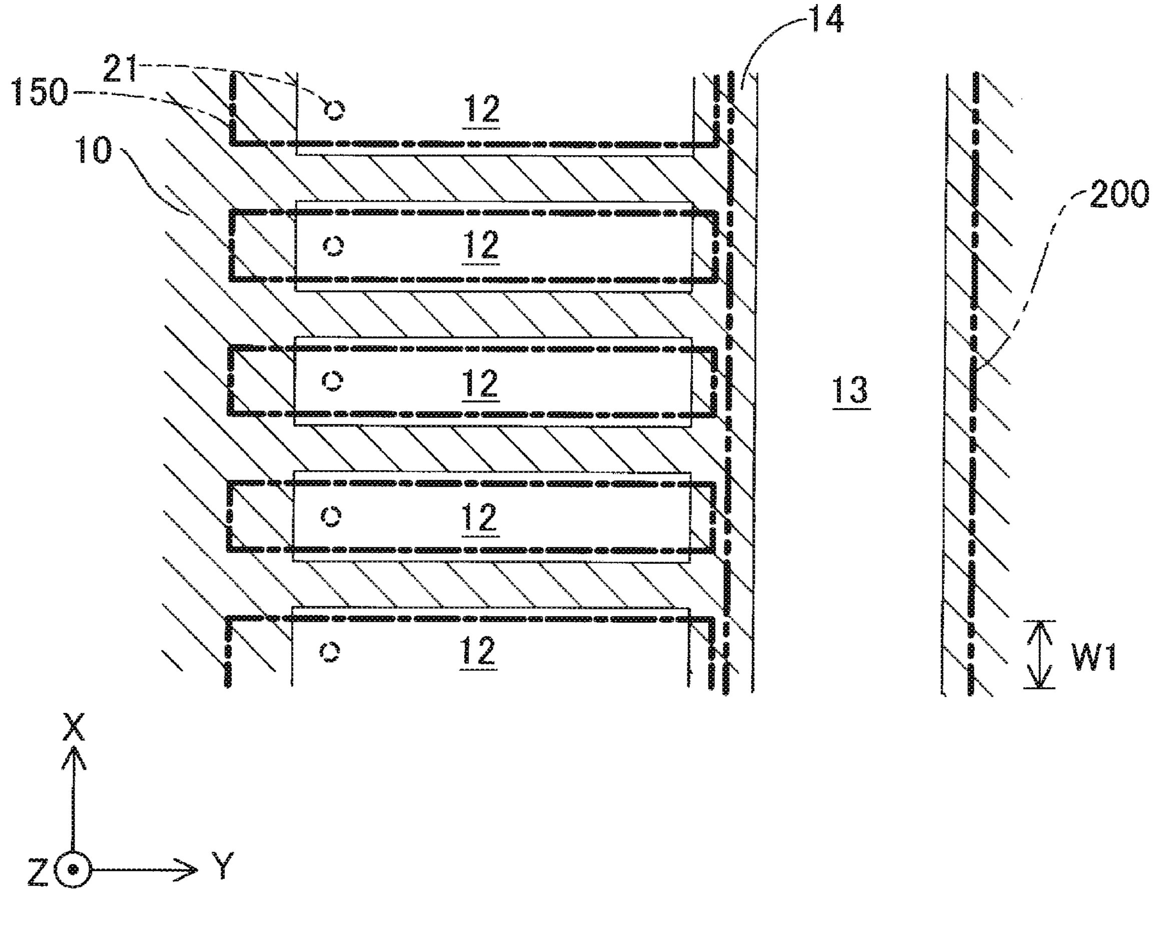
FIG. 4 is a sectional view of a pressure chamber and an absorbing chamber along line IV-IV in FIG. 3.

FIG. 4 is a sectional view of the pressure chamber 12 and the absorbing chamber 13 along line IV-IV in FIG. 3. A broken line indicates a position of a nozzle 21. A one-dot broken line indicates a position of an actuator 150. A two-dot broken line indicates a position of an absorbing section 200. A plurality of pressure chambers 12 are arrayed in the Y-axis direction so as to individually correspond to the plurality of nozzles 21. Each of the pressure chambers 12 is formed as a space having a longitudinal direction in the Y-axis direction and a transverse direction in the X-axis direction. The plurality of pressure chambers 12 are coupled to one absorbing chamber 13. The absorbing chamber 13 extends in the X-axis direction intersecting a direction in which the pressure chamber 12 extends. The absorbing chamber 13 is formed as a space having a longitudinal direction in the X-axis direction and a transverse direction in the Y-axis direction. The longitudinal direction of the absorbing chamber 13 is the same as the direction in which the plurality of pressure chambers 12 are arrayed. The longitudinal direction of the absorbing chamber 13 is also referred to as a first direction. The longitudinal direction of the pressure chamber 12 is also referred to as a second direction.

In Embodiment 1, dimension W1 in the X-axis direction of the actuator 150 corresponding to one pressure chamber 12 is smaller than dimension W2 in the X-axis direction of the absorbing section 200. For convenience of illustration, dimension W2 is omitted in FIG. 4. When dimension W1 is set to be smaller than dimension W2, the flexibility of the absorbing section 200 is readily ensured compared with an instance in which dimension W1 is larger than dimension W2 and an instance in which dimension W1 is equal to dimension W2. Note that the functions of the pressure chamber 12 and the absorbing chamber 13 are described later.

As illustrated in FIGS. 2 and 3, the communication substrate 15 is arranged between the pressure chamber substrate 10 and the nozzle substrate 20. The communication substrate 15 is fixed to the nozzle substrate 20 with an adhesive. The communication substrate 15 is formed of, for example, a silicon single-crystal substrate. When the communication substrate 15 is arranged between the pressure chamber substrate 10 and the nozzle substrate 20, planarity of the nozzle substrate 20 is readily ensured compared with an instance in which the pressure chamber substrate 10 and the nozzle substrate 20 are stacked in direct contact with each other. As a result, it is possible to stabilize the quality of the liquid ejected from the nozzles 21.

As illustrated in FIG. 3, a first communication channel 16, a first common liquid chamber 17, a second common liquid chamber 18, and a second communication channel 19 are formed in the communication substrate 15. The first communication channel 16 is formed as an opening passing through the communication substrate 15 in the Z-axis direction. The first communication channel 16 is a channel that couples the pressure chamber 12 and the nozzle 21. First communication channels 16 of the number corresponding to the number of nozzles 21 are formed in the communication substrate 15.

The first common liquid chamber 17 is formed as an opening passing through the communication substrate 15 in the Z-axis direction. The second common liquid chamber 18 is formed as a recess provided in the lower surface of the communication substrate 15. The first common liquid chamber 17 and the second common liquid chamber 18 constitute a common liquid chamber section 25 together with a liquid chamber section 42 formed in the case member 40 described later. The common liquid chamber section 25 constitutes a portion of a channel for the liquid and stores the liquid to be supplied to the nozzle 21. The second communication channel 19 is formed as an opening passing through the communication substrate 15 in the Z-axis direction. The second communication channel 19 is a channel that couples the absorbing chamber 13 and the second common liquid chamber 18.

As illustrated in FIG. 2, the nozzle substrate 20 is arranged on a surface of the communication substrate 15 opposite to the surface thereof in contact with the pressure chamber substrate 10, that is, on the −Z-side surface of the communication substrate 15. The nozzle substrate 20 is formed of, for example, a stainless steel substrate, a substrate made of an organic material, such as a polyimide resin, or a silicon single-crystal substrate. The nozzle substrate 20 has the plurality of nozzles 21. The plurality of nozzles 21 are holes passing through the nozzle substrate 20 in the Z-axis direction. The plurality of nozzles 21 are arrayed in the X-axis direction. The pressure chamber substrate 10, the communication substrate 15, and the nozzle substrate 20 are also collectively referred to as a channel substrate.

The vibrating section 30 is arranged on a surface of the pressure chamber substrate 10 opposite to the surface thereof in contact with the communication substrate 15, that is, on the +Z-side surface of the pressure chamber substrate 10. As illustrated in FIG. 3, the vibrating section 30 includes a protection substrate 31, the actuator 150, a vibration plate 155, and the absorbing section 200. The absorbing section 200 is also referred to as a second piezoelectric element.

The protection substrate 31 is stacked on the pressure chamber substrate 10 with the vibration plate 155 therebetween. The protection substrate 31 is made of a similar material to that of the pressure chamber substrate 10. The protection substrate 31 is provided for protecting the actuator 150 by using a recess 33 described later.

Figure 5:
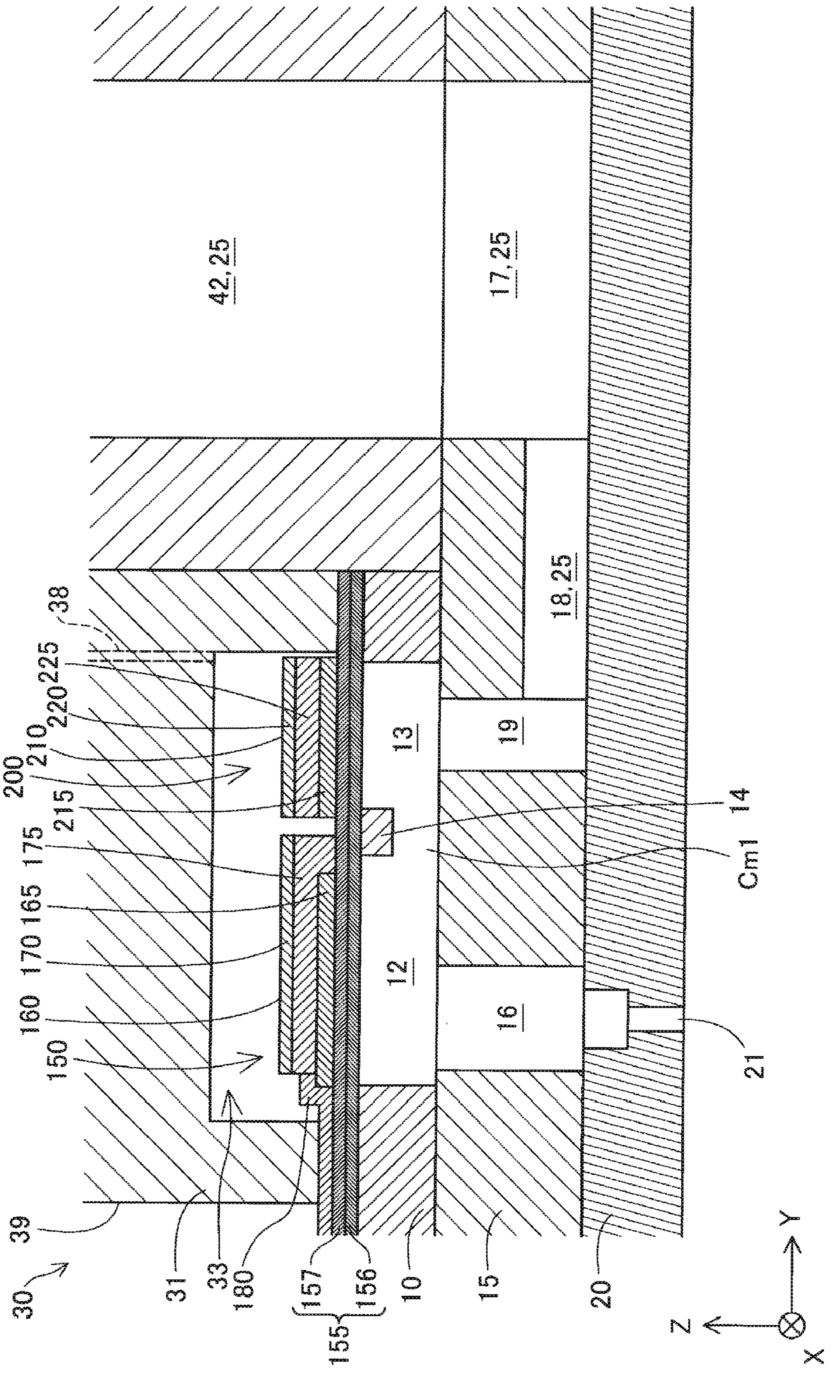
FIG. 5 is an enlarged view of a vibrating section in FIG. 3.

FIG. 5 is an enlarged view of the vibrating section 30 in FIG. 3. As illustrated in FIG. 5, the recess 33, an air communication hole 38, and a through hole 39 are formed in the protection substrate 31 of the vibrating section 30. The recess 33 opens to the −Z side. The recess 33 is not coupled to a channel for the liquid. Thus, no liquid flows in the recess 33. The air communication hole 38 is coupled to an end of the recess 33 in the X-axis direction. The recess 33 is coupled to the outside via the air communication hole 38. As a result, a simple configuration keeps the pressure in the recess 33 at atmospheric pressure. As illustrated in FIG. 3, the through hole 39 is formed to pass through, in the Z-axis direction, a central portion of the protection substrate 31 in the Y-axis direction. The wiring substrate 120 described later is inserted into the through hole 39.

As illustrated in FIG. 5, the actuator 150 of the vibrating section 30 is arranged on the vibration plate 155 in the recess 33. The actuator 150 vibrates the vibration plate 155 to apply pressure to the liquid in the pressure chamber 12. The actuator 150 has a piezoelectric element 160 and a wire 180.

The piezoelectric element 160 is stacked on the vibration plate 155 at a position overlapping the pressure chamber 12. More specifically, the piezoelectric element 160 is provided on the upper surface of the vibration plate 155 at a position overlapping the pressure chamber 12 when viewed in the stacking direction. The upper surface of the vibration plate 155 is a surface on a side opposite to the side on which the pressure chamber 12 is present. The upper surface of the vibration plate 155 is also referred to as a first surface. During liquid ejection, the vibration plate 155 is vibrated by driving of the piezoelectric element 160, and pressure is applied to the liquid in the pressure chamber 12. The piezoelectric element 160 is also referred to as a first piezoelectric element.

The piezoelectric element 160 includes a plurality of first electrodes 165, a second electrode 170, and a piezoelectric body 175. Each of the first electrodes 165 is arranged on the vibration plate 155 at a position overlapping the corresponding one of the pressure chambers 12. The first electrode 165 is also referred to as an individual electrode. The second electrode 170 is arranged at a position farther than the first electrode 165 from the pressure chamber 12 in the stacking direction. The second electrode 170 is an electrode common to the plurality of first electrodes 165. The second electrode 170 is arranged across the range overlapping all the plurality of first electrodes 165. The second electrode 170 is also referred to as a common electrode. Since the first electrode 165, which is provided for each pressure chamber 12, is arranged at a position close to the vibration plate 155, a piezoelectric strain of the piezoelectric element 160 is able to be efficiently propagated to the vibration plate 155. The first electrode 165 and the second electrode 170 are made of various kinds of metals, such as platinum, iridium, titanium, tungsten, or tantalum, and a conductive metal oxide, such as lanthanum nickel oxide ($LaNiO_3$).

The piezoelectric body 175 is provided between the first electrode 165 and the second electrode 170. The piezoelectric body 175 is also referred to as a first piezoelectric body. The piezoelectric body 175 is made of lead zirconate titanate (PZT). Note that, instead of PZT, the piezoelectric body 175 may be made of another kind of ceramic material with a so-called perovskite structure, typified by $ABO_3$ type. Examples of the ceramic material include barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, and lead scandium niobate.

The first electrode 165 and a drive circuit 121 described later are electrically coupled to each other by the wire 180. The wire 180 is made of a conductive material. Note that, although not illustrated in FIG. 5, the second electrode 170 and the drive circuit 121 are electrically coupled to each other by another wire made of a conductive material. The actuator 150 is able to be produced by etching using photoresist masking, for example. The detailed function of the actuator 150 is described later.

The vibration plate 155 of the vibrating section 30 is stacked on the pressure chamber substrate 10 at a position overlapping the pressure chamber 12 and at a position overlapping the absorbing chamber 13 when the pressure chamber substrate 10 is viewed in the stacking direction. The vibration plate 155 is arranged so as to cover the plurality of pressure chambers 12 and the absorbing chamber 13. The vibration plate 155 includes a flexible layer 156 formed on the pressure chamber substrate 10 and a protective layer 157 formed on the flexible layer 156. The flexible layer 156 is made of, for example, silicon dioxide. The protective layer 157 is made of, for example, zirconium oxide. Note that the pressure chamber substrate 10 and the vibration plate 155 may be formed at least partially from an integrated member.

The absorbing section 200 of the vibrating section 30 is arranged on the vibration plate 155 in the recess 33. The absorbing section 200 includes a piezoelectric element 210. The piezoelectric element 210 is stacked on the vibration plate 155 at a position overlapping the absorbing chamber 13. More specifically, the piezoelectric element 210 is provided on the upper surface of the vibration plate 155 at a position overlapping the absorbing chamber 13 when viewed in the stacking direction. The piezoelectric element 210 absorbs at least some of the vibration of the liquid propagated from the pressure chamber 12 to the absorbing chamber 13. The piezoelectric element 210 is also referred to as a second piezoelectric element. The piezoelectric element 210 includes a third electrode 215, a fourth electrode 220, and a piezoelectric body 225. The piezoelectric body 225 is also referred to as a second piezoelectric body. The third electrode 215 is provided on the vibration plate 155 at a position overlapping the absorbing chamber 13. The fourth electrode 220 is arranged at a position farther than the third electrode 215 from the absorbing chamber 13 in the stacking direction. Moreover, the fourth electrode 220 is arranged at a position overlapping the absorbing chamber 13. Each of the fourth electrode 220 and the third electrode 215 is electrically coupled to a voltage detecting circuit 122 described later by a wire (not illustrated) made of a conductive material. The voltage detecting circuit 122 is also referred to as a pressure detecting section.

The piezoelectric body 225 is provided between the third electrode 215 and the fourth electrode 220. The piezoelectric body 225 is formed to have a uniform thickness, for example. The piezoelectric body 225 is desirably made of the same material as that of the piezoelectric body 175. Additionally, the third electrode 215 and the fourth electrode 220 are desirably made of a similar material to that of the first electrode 165 and the second electrode 170. By using the same or a similar material as described above, the piezoelectric element 160 of the actuator 150 and the piezoelectric element 210 of the absorbing section 200 are able to be manufactured in the same process, making it possible to simplify the manufacturing process and reduce cost. Note that the piezoelectric body 225 may be made of a material different from that of the piezoelectric body 175. In this instance, the piezoelectric body 225 may be made of, for example, an organic piezoelectric material. Examples of the organic piezoelectric material include polyvinylidene fluoride (PVDF), which is a fluorine-containing polymer semiconductor material, a polyvinylidene fluoride-trifluoroethylene copolymer (P(VDF-TrFE)), which is obtained by copolymerizing polyvinylidene fluoride (PVDF) and trifluoroethylene (TrFE), polylactic acid, and polyamino acid.

The third electrode 215 and the fourth electrode 220 may be arranged so as to overlap the entire piezoelectric body 225 or overlap at least a portion of the piezoelectric body 225. Note that the detailed function of the absorbing section 200 is described later.

As illustrated in FIG. 2, the case member 40 is arranged on the +Z side with respect to the head main body 11. As illustrated in FIG. 3, the case member 40 has the liquid chamber section 42, a coupling port 43, and two liquid communication ports 44. The liquid chamber section 42 constitutes the common liquid chamber section 25, in which the liquid flows, together with the first common liquid chamber 17 and the second common liquid chamber 18. The coupling port 43 is an opening passing through the case member 40 in the Z-axis direction. The wiring substrate 120 is inserted into the coupling port 43. Each of the liquid communication ports 44 is a hole passing through the case member 40 in the Z-axis direction. The liquid flows into the liquid ejecting head 100 through the liquid communication port 44. The case member 40 is made of, for example, a resin material or a metal material.

The drive circuit 121 and the voltage detecting circuit 122 are provided in the wiring substrate 120. The drive circuit 121 is a circuit for driving the actuator 150. The drive circuit 121 is electrically coupled to the first electrode 165 via the wiring substrate 120 and the wire 180. The drive circuit 121 is also electrically coupled to the second electrode 170 via the wiring substrate 120 and a wire (not illustrated). Further, the drive circuit 121 is electrically coupled to the control section 500 via the wiring substrate 120 and a wire (not illustrated).

The drive circuit 121 generates a driving signal for driving the actuator 150, based on a control signal supplied from the control section 500. The drive circuit 121 is also referred to as a drive section. The driving signal is also referred to as a first driving signal. In a state where the drive circuit 121 sets the second electrode 170 to a reference potential, the drive circuit 121 supplies the driving signal to the first electrode 165.

The voltage detecting circuit 122 is electrically coupled to the third electrode 215 via the wiring substrate 120 and a wire (not illustrated). The voltage detecting circuit 122 is also electrically coupled to the fourth electrode 220 via the wiring substrate 120 and a wire (not illustrated). Further, the voltage detecting circuit 122 is electrically coupled to the control section 500 via the wiring substrate 120 and a wire (not illustrated).

The voltage detecting circuit 122 detects an electromotive force of the piezoelectric element 210 and outputs a signal indicating the detected electromotive force of the piezoelectric element 210 to the control section 500. For example, a residual vibration of the liquid propagated from the pressure chamber 12 to the absorbing chamber 13 is propagated to the piezoelectric element 210 via the vibration plate 155 after the piezoelectric element 160 is driven to eject the liquid. The electromotive force of the piezoelectric element 210 is generated by the residual vibration. In FIG. 3, the drive circuit 121 and the voltage detecting circuit 122 are separately provided but may be provided on one substrate.

The functions of the pressure chamber 12 and the actuator 150 are described below. The actuator 150 vibrates the vibration plate 155 to apply pressure to the liquid in the pressure chamber 12. Specifically, in a state where the second electrode 170 is set to the reference potential, a driving signal is supplied to the first electrode 165. The reference potential is, for example, a ground potential. The driving signal is, for example, a signal for applying a voltage that changes over time. When a voltage is applied to the first electrode 165 and the second electrode 170, a piezoelectric strain occurs in a portion of the piezoelectric body 175 sandwiched by the first electrode 165 and the second electrode 170. The actuator 150 is driven in such a manner. The actuator 150 is driven to vibrate the vibration plate 155. Note that no piezoelectric strain occurs in a portion of the piezoelectric body 175 that is not sandwiched between the first electrode 165 and the second electrode 170. When pressure is applied to the liquid in the pressure chamber 12, the liquid is ejected from the nozzle 21 through the first communication channel 16. The nozzle 21, the pressure chamber 12, the vibration plate 155, and the piezoelectric element 160 are also collectively referred to as an ejection section.

Next, the functions of the absorbing chamber 13 and the absorbing section 200 are described. When pressure is applied to the liquid in the pressure chamber 12 by driving of the actuator 150 as described above, part of the liquid in the pressure chamber 12 is ejected to the outside from the nozzle 21 located downstream of the pressure chamber 12, but other part of the liquid in the pressure chamber 12 flows into the absorbing chamber 13 common to the plurality of pressure chambers 12, which is located upstream of the pressure chamber 12. As a result, vibration of the liquid is propagated from the pressure chamber 12 to the absorbing chamber 13. The piezoelectric element 210 of the absorbing section 200 is bent in accordance with the vibration of the liquid propagated to the absorbing chamber 13, and the vibration of the liquid is absorbed. As a result, it is possible to keep the pressure in the absorbing chamber 13 at fixed pressure or below and also possible to reduce the pressure in the pressure chamber 12 coupled to the absorbing chamber 13.

As illustrated in FIG. 5, since the pressure chamber 12 and the absorbing chamber 13 are provided at the same position in the Z-axis direction so as to be adjacent to each other in the Y-axis direction, the absorbing chamber 13 is able to efficiently absorb the vibration of the liquid propagated from the pressure chamber 12. Note that the absorbing section 200 is desirably formed so as to have flexibility suitable for absorbing the vibration of the liquid propagated from the pressure chamber 12 by selecting a material of the absorbing section 200 and adjusting the thickness of the absorbing section 200.

In Embodiment 1, the absorbing section 200 is further used to detect the pressure of the liquid in the absorbing chamber 13. The control section 500 detects the pressure of the liquid in the absorbing chamber 13, based on an electromotive force of the piezoelectric element 210. Specifically, the control section 500 detects a change in electromotive force of the piezoelectric element 210 from a signal supplied from the voltage detecting circuit 122. The control section 500 determines whether the pressure in the absorbing chamber 13 and in the pressure chamber 12 has a normal state or an abnormal state from a change in pressure in the absorbing chamber 13, which is indicated by the change in electromotive force of the piezoelectric element 210.

With an abnormal state of the pressure in the pressure chamber 12 and in the absorbing chamber 13, an operation of ejecting the liquid is not performed normally in some cases. Alternatively, an abnormal state of the pressure in the pressure chamber 12 and in the absorbing chamber 13 may lower the stability of the quality of the liquid ejected from the nozzle 21.

An abnormal state of the pressure in the absorbing chamber 13 and in the pressure chamber 12 occurs due to the following causes, for example. Air bubbles may be mixed in the pressure chamber 12 during liquid ejection. In this instance, the pressure in the pressure chamber 12 and in the absorbing chamber 13 increases compared with that in a normal state where no air bubbles are mixed. When the viscosity of the liquid increases due to a decrease in temperature, the pressure in the pressure chamber 12 and in the absorbing chamber 13 during liquid ejection may change compared with that in a normal state. Also when an amount of the liquid supplied to a channel for the liquid including the pressure chamber 12 and the absorbing chamber 13 becomes insufficient due to failure of a pump (not illustrated) used for supplying the liquid to the channel for the liquid including the pressure chamber 12 and the absorbing chamber 13, the pressure in the pressure chamber 12 and in the absorbing chamber 13 during liquid ejection may change compared with that in a normal state. Due to failure in attachment and detachment of a cartridge, failure in initial liquid filling, or the like, the pressure in the pressure chamber 12 and in the absorbing chamber 13 may change compared with that in a normal state.

When determining that the pressure in the absorbing chamber 13 and in the pressure chamber 12 has an abnormal state, the control section 500 displays an alert indicating an occurrence of an abnormality on, for example, a display of the liquid ejecting apparatus 300. Alternatively, the control section 500 performs cleaning processing of the liquid ejecting head 100 by ejecting the liquid from the nozzles 21.

In Embodiment 1, the liquid ejecting apparatus 300 detects a change in pressure in the absorbing chamber 13 from a change in electromotive force generated by the piezoelectric element 210 different from the piezoelectric element 160 that applies pressure to the pressure chamber 12. This makes it possible to simultaneously perform an operation of ejecting the liquid during printing and an operation of detecting pressure of the liquid in the pressure chamber 12 and in the absorbing chamber 13. Accordingly, it is possible to detect a change in pressure of the liquid in the pressure chamber 12 and in the absorbing chamber 13 at not only a time during which no liquid is ejected but also a time during which liquid is ejected. In the related art, it is difficult to detect a change in pressure in the pressure chamber 12 during liquid ejection. In the configuration according to Embodiment 1, however, it is possible to detect a change in pressure in the pressure chamber 12 even during liquid ejection. Thus, an abnormal state of the pressure in the pressure chamber 12 is able to be detected even during liquid ejection.

In Embodiment 1, a change in pressure of the liquid in the absorbing chamber 13 common to the plurality of pressure chambers 12 is detected. For example, when a change in pressure of the liquid in the individual pressure chamber 12 is detected, a mechanism that detects a change in pressure needs to be provided for each of the pressure chambers 12 to monitor each of the pressure chambers 12, resulting in a complex configuration for detecting pressure. In Embodiment 1, however, since a change in pressure of the liquid in the common absorbing chamber 13 is detected, it is possible to achieve a simple configuration for detecting a change in pressure.

Furthermore, it is possible to simultaneously perform an operation of ejecting a liquid during printing and an operation of detecting pressure of the liquid in an absorbing chamber, and thus the operation of ejecting the liquid does not need to be stopped for performing the operation of detecting pressure. As a result, it is possible to shorten a waiting time in a printing operation.

Figure 9:
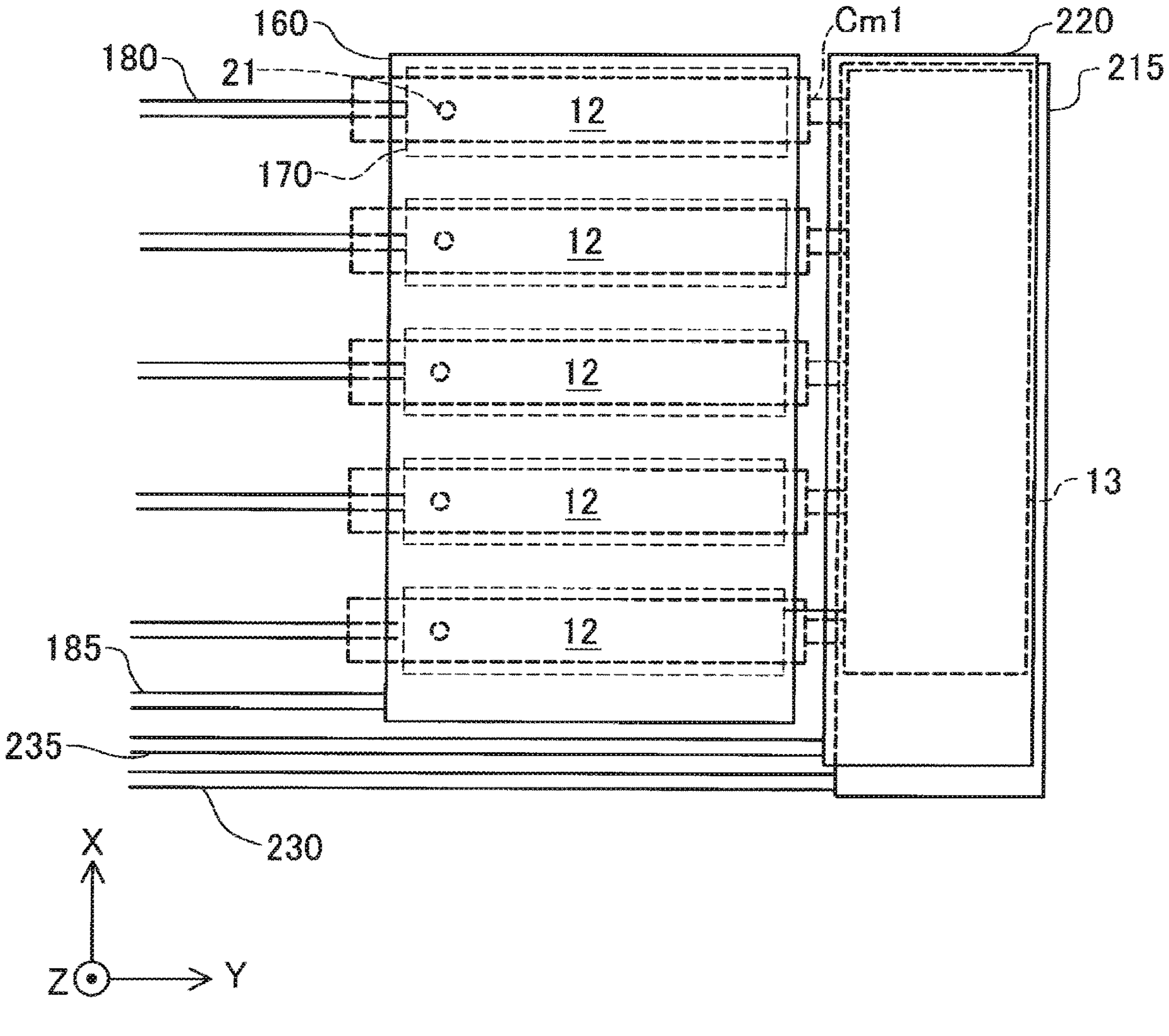
FIG. 9 is a view illustrating an example of arrangement of a driving wire and a detecting wire.

FIG. 9 is a view illustrating an example of arrangement of a driving wire coupled to the piezoelectric element 160 and a detecting wire coupled to the piezoelectric element 210. Note that, in FIG. 9, illustration of the piezoelectric body 175, the piezoelectric body 225, the drive circuit 121, and the voltage detecting circuit 122 is omitted. The driving wire includes the wire 180 by which the first electrode 165 and the drive circuit 121 are coupled and the wire 185 by which the second electrode 170 and the drive circuit 121 are coupled. The wire 180 is also referred to as a first driving wire. The wire 185 is also referred to as a second driving wire. The wire 180 and the wire 185 extend at least partially in the second direction. Since first electrodes 165 are provided so as to correspond to the number of nozzles 21, wires 180 are also arranged so as to correspond to the number of nozzles 21. The plurality of wires 180 are also referred to as a group of first driving wires.

The detecting wire includes a wire 230 by which the third electrode 215 and the voltage detecting circuit 122 are coupled and a wire 235 by which the fourth electrode 220 and the voltage detecting circuit 122 are coupled. The wire 230 is also referred to as a first detecting wire. The wire 235 is also referred to as a second detecting wire. The wire 230 and the wire 235 extend at least partially in the second direction.

As described above, in the state where the drive circuit 121 sets the second electrode 170 to the reference potential via the wire 185, the drive circuit 121 supplies the driving signal to the first electrode 165 via the wire 180. Here, since the driving signal supplied to the first electrode 165 via the wire 180 is a signal for applying a voltage that changes over time, electrical noise is likely to be generated by the wire 180. On the other hand, the reference potential set to the second electrode 170 is a fixed voltage, and electrical noise is less likely to be generated by the wire 185 compared with the wire 180. Accordingly, in the example illustrated in FIG. 9, the wire 185 is arranged between the wire 230 and the wire group of wires 180 from which noise is likely to be generated. The presence of a space between the wire 230 and the wire group of wires 180 makes it possible to reduce the influence of noise, which is generated by the wire 180, on the wire 230 or the wire 235. Moreover, noise generated by the wire 180 is blocked by the wire 185, making it possible to reduce the influence of the noise on the wire 230 or the wire 235. As a result, it is possible to suppress the influence of noise, which results from the voltage detecting circuit 122 detecting a change in electromotive force of the piezoelectric element 210 and to detect a change in pressure in the absorbing chamber 13 with higher accuracy.

A2. Embodiment 2

In Embodiment 2, another example of a configuration of the piezoelectric element 210 of the absorption section 200 is described. Hereinafter, a configuration different from that in Embodiment 1 is mainly described, and a description of a configuration similar to that in Embodiment 1 is omitted.

Figure 6:
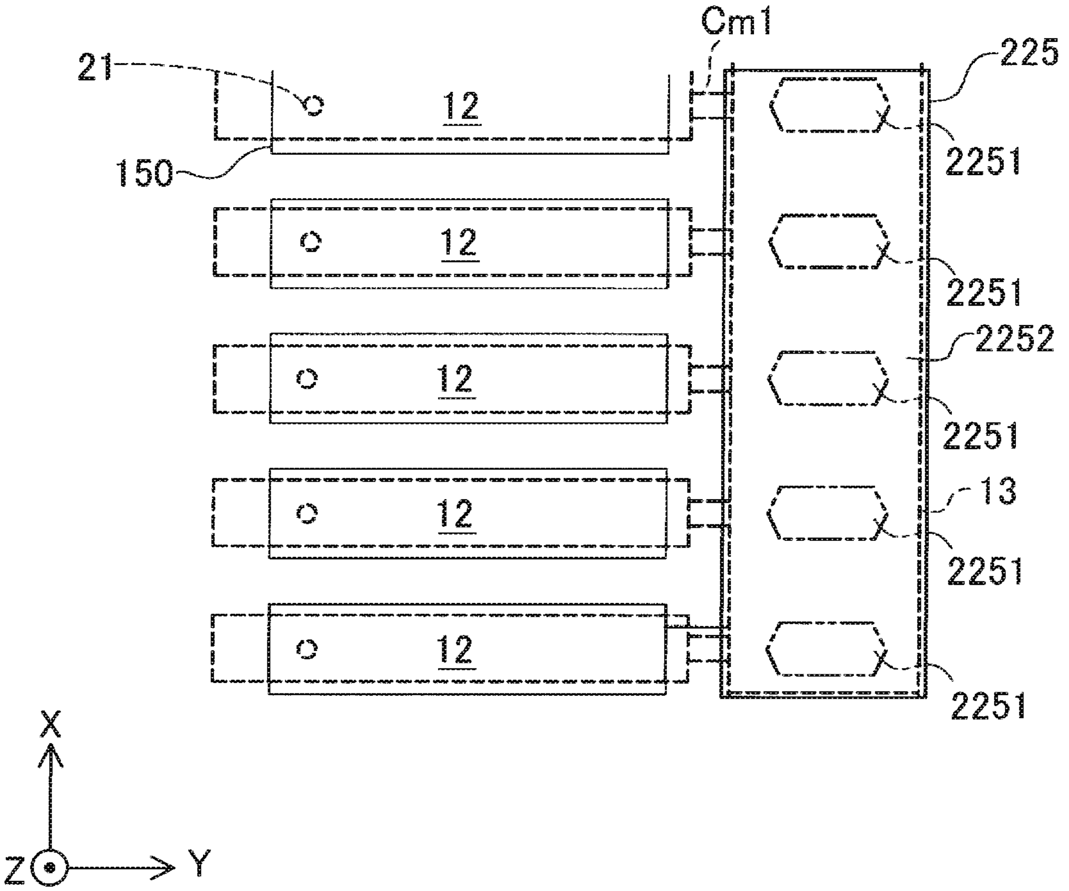
FIG. 6 is a view illustrating an example of arrangement of a piezoelectric body.

FIG. 6 is a view illustrating arrangement of the piezoelectric body 225 of the piezoelectric element 210. FIG. 6 illustrates, in the recess 33, arrangement of the piezoelectric body 225 when the piezoelectric element 210 is viewed in the −Z direction. Note that, for ease of understanding, illustration of the fourth electrode 220 is omitted in FIG. 6. A broken line indicates a position of each of the pressure chamber 12, the absorbing chamber 13, and the communication channel Cm1. Moreover, a broken line indicates a position of the nozzle 21.

As illustrated in FIG. 6, the absorbing chamber 13 includes a first region 2251 and a second region 2252 that surrounds the first region 2251 when viewed in the Z-axis direction. A thickness of the piezoelectric body 225 overlapping the second region 2252 when viewed in the Z-axis direction is set to a predetermined thickness. A thickness of the piezoelectric body 225 overlapping the first region 2251 when viewed in the Z-axis direction is set to be thinner than that of the piezoelectric body 225 overlapping the second region 2252. Alternatively, when viewed in the Z-axis direction, the piezoelectric body 225 is provided so as to overlap the second region 2252, whereas the piezoelectric body 225 is provided so as not to overlap the first region 2251. Note that the thickness of the piezoelectric body 225 refers to a thickness thereof in the Z-axis direction.

In the region in which the piezoelectric body 225 overlaps the absorbing chamber 13, since the first region 2251 in which the piezoelectric body 225 is formed to be thin is provided, it is possible to increase a bending amount of the piezoelectric body 225 compared with an instance in which the piezoelectric body 225 has a uniform thickness.

The second region 2252 includes a portion formed to be continuous from a position corresponding to one end of the absorbing chamber 13 in the Y-axis direction to a position corresponding to the other end thereof. Since the absorbing chamber 13 is formed as a space having a longitudinal direction in the X-axis direction and a transverse direction in the Y-axis direction, displacement of the piezoelectric element 210 in the Y-axis direction is larger than that in the X-axis direction. Since the second region 2252 includes the portion formed to be continuous in the Y-axis direction, stress applied to the piezoelectric body 225 is dispersed, making it possible to efficiently absorb vibration of the liquid propagated from the pressure chamber 12.

In the region overlapping the absorbing chamber 13 when viewed in the stacking direction, the third electrode 215 and the fourth electrode 220 are formed to be continuous from a position corresponding to one end of the absorbing chamber 13 in the Y-axis direction to a position corresponding to the other end thereof. Since the absorbing chamber 13 is formed as a space having a longitudinal direction in the X-axis direction and a transverse direction in the Y-axis direction, displacement of the piezoelectric element 210 in the Y-axis direction is larger than that in the X-axis direction. Since the third electrode 215 and the fourth electrode 220 are formed to be continuous in the Y-axis direction, it is possible to detect a larger electromotive force by using the piezoelectric element 210.

Alternatively, in the region in which the piezoelectric element 210 and the absorbing chamber 13 overlap each other, no piezoelectric body may be formed in the first region 2251 and the piezoelectric body 225 may be formed in the second region 2252 surrounding the first region 2251. Since the first region 2251 in which no piezoelectric body is formed is surrounded by the second region 2252 in which the piezoelectric body 225 is formed, it is possible to increase a bending amount of the piezoelectric body 225 compared with an instance in which the piezoelectric body 225 has a uniform thickness.

Note that the method of arranging the first region 2251 and the second region 2252 illustrated in FIG. 6 is an example. In the example illustrated in FIG. 6, first regions 2251 corresponding to the pressure chambers 12 are arrayed in the X-axis direction. Each of the first regions 2251 is arranged at the same position as that of the corresponding one of the pressure chambers 12 in the X-axis direction. A pair of the first region 2251 in which no piezoelectric body is formed and the second region 2252 which surrounds the first region 2251 and in which the piezoelectric body 225 is formed is provided so as to correspond to each of the pressure chambers 12.], one pair of the first region 2251 and the second region 2252 may be arranged so as to correspond to two or more pressure chambers 12. The second region 2252 does not necessarily surround the first region 2251.

A3. Embodiment 3

In Embodiment 3, an example in which the absorbing section 200 and the actuator 150 are integrally formed is described. Hereinafter, a configuration different from that in Embodiment 1 is mainly described, and a description of a configuration similar to that in Embodiment 1 is omitted.

Figure 7:
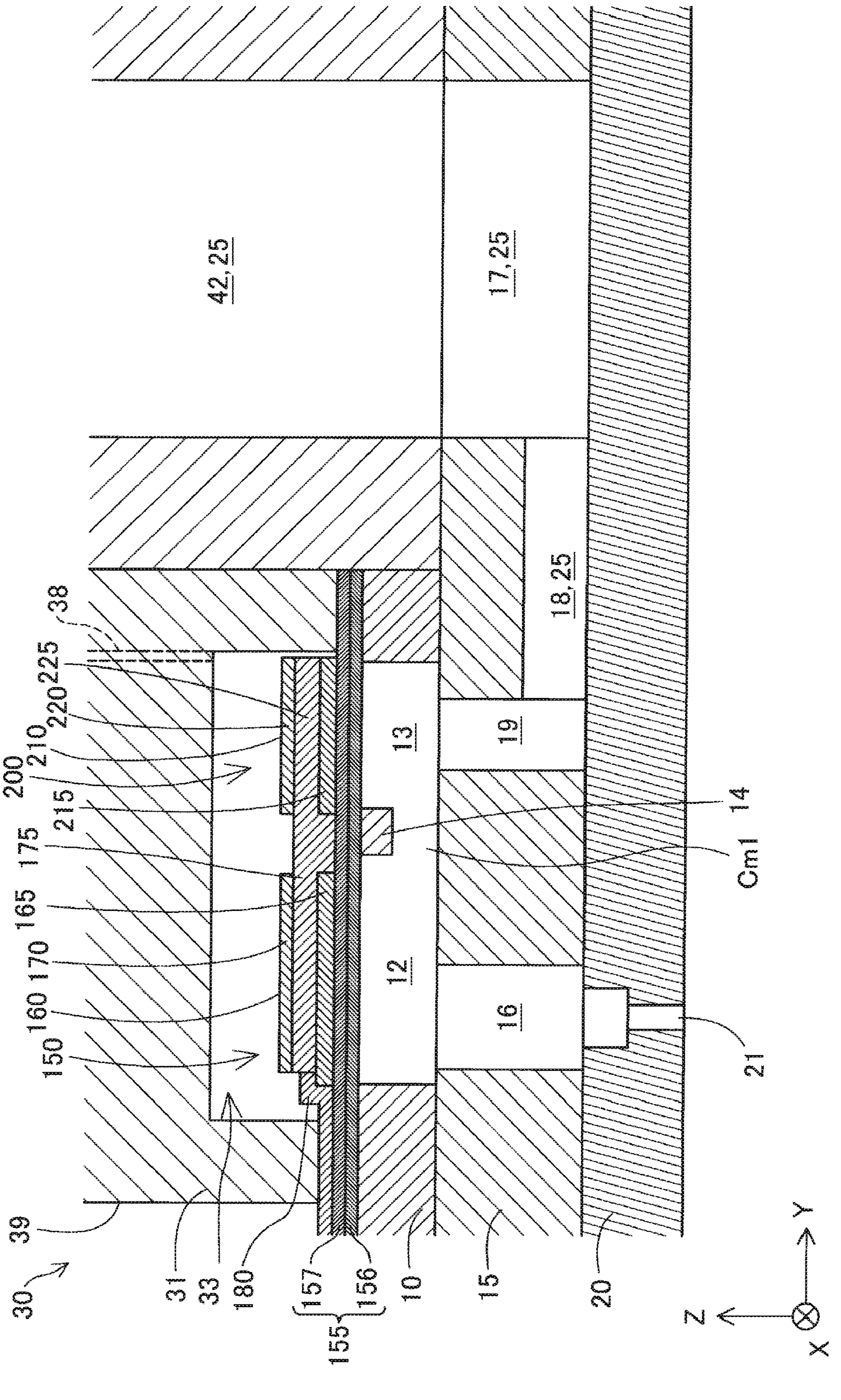
FIG. 7 is an enlarged view of a vibrating section according to Embodiment 3.

FIG. 7 is an enlarged view of a vibrating section 30 according to Embodiment 3. In Embodiment 3, the piezoelectric body 225 of the absorbing section 200 is integrally formed with the piezoelectric body 175 of the actuator 150. The illustrated example indicates a portion corresponding to the piezoelectric body 175 sandwiched by the first electrode 165 and the second electrode 170 and a portion corresponding to the piezoelectric body 225 sandwiched by the third electrode 215 and the fourth electrode 220. Since the piezoelectric body 175 of the actuator 150 and the piezoelectric body 225 of the absorbing section 200 are formed as a continuous piezoelectric body, it is possible to reduce the time and effort for forming a piezoelectric body compared with an instance in which the piezoelectric body 175 and the piezoelectric body 225 are separately formed.

Note that, in the piezoelectric body 175 and the piezoelectric body 225 that are integrally formed, a portion that is not sandwiched between electrodes does not cause a piezoelectric strain. Accordingly, driving the actuator 150 does not affect a pressure detection result of the absorbing section 200.

A4. Embodiment 4

In Embodiments 1 to 4, the example in which the absorbing section 200 including the piezoelectric element 210 is arranged above the absorbing chamber 13 is described, but the absorbing section 200 is not limited to being arranged thereabove.

Figure 8:
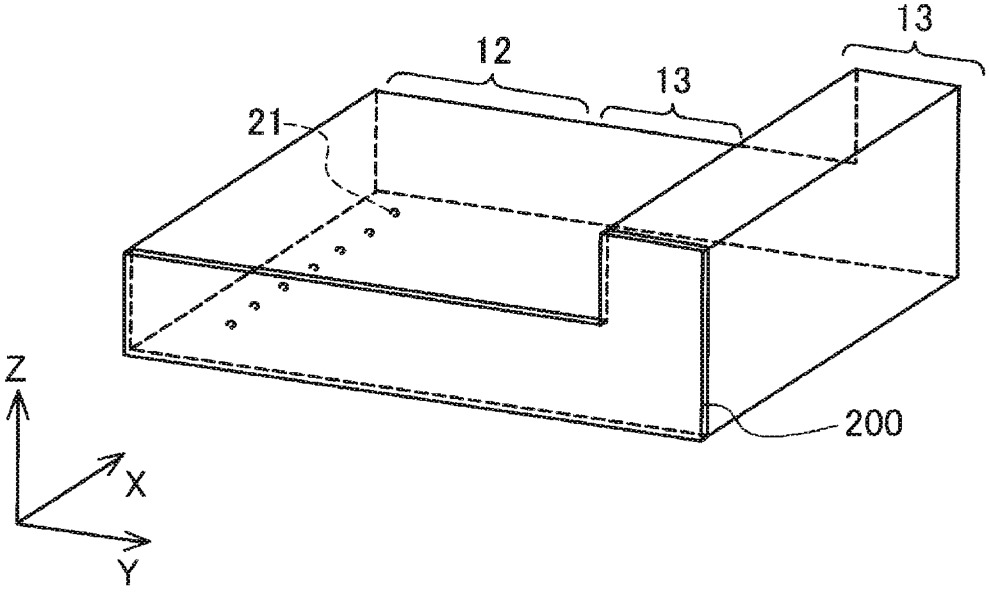
FIG. 8 is a schematic view illustrating arrangement of an absorbing section according to Embodiment 4.

FIG. 8 is a schematic view illustrating arrangement of the absorbing section 200 according to Embodiment 4. In Embodiment 4, the absorbing section 200 is arranged on the side surfaces of the pressure chamber 12 and the absorbing chamber 13. In the illustrated example, the surfaces of the pressure chamber 12 and the absorbing chamber 13, which are parallel to the YZ plane, are defined to the side surfaces. In this instance, the absorbing section 200 is provided not on the vibration plate 155 but at the pressure chamber substrate 10 in which the pressure chamber 12 and the absorbing chamber 13 are formed. Differently from Embodiment 1, the absorbing section 200 is arranged so as to overlap the pressure chamber 12 besides the absorbing chamber 13, making it possible to improve the accuracy in detecting pressure of the liquid.

When no nozzle 21 is provided on the −Z side with respect to the pressure chamber 12, the absorbing section 200 may be arranged on the bottom surfaces of the pressure chamber 12 and the absorbing chamber 13. Also in this instance, the absorbing section 200 is arranged so as to overlap the pressure chamber 12 besides the absorbing chamber 13, making it possible to improve the accuracy in detecting pressure of the liquid.

B. Other Embodiments

In Embodiment 1, the example in which one absorbing chamber 13 is coupled to the plurality of the pressure chambers 12 is described. However, one absorbing chamber 13 may be coupled to a set number of pressure chambers 12. For example, one absorbing chamber 13 may be coupled to ten pressure chambers 12. When the liquid ejecting apparatus 300 includes fifty pressure chambers 12, five absorbing chambers 13 are provided. Also in such an instance, since a change in pressure of the liquid in the absorbing chamber 13 common to the plurality of pressure chambers 12 is detected, it is possible to achieve a simple configuration for detecting a change in pressure.

Alternatively, the absorbing chamber 13 may be provided for each of the pressure chambers 12. In this instance, it is possible to determine, for each of the pressure chambers 12, whether the inside pressure has a normal state or an abnormal state. Moreover, it is possible to investigate distribution of the states of the inside pressures in the plurality of pressure chambers 12.

Furthermore, the control section 500 of the liquid ejecting apparatus 300 is able to simultaneously perform an ejecting operation of applying pressure to the liquid in the pressure chamber to eject the liquid from the nozzle 21 by driving the first piezoelectric element and a detecting operation of detecting pressure of the liquid in the absorbing chamber from an electromotive force of the second piezoelectric element. However, the control section 500 does not necessarily perform the ejecting operation and the detecting operation simultaneously.

In Embodiment 1, the example in which the piezoelectric element 160 and the piezoelectric element 210 are manufactured from the same material is described. In this instance, it is possible to reduce the number of types of required materials. Alternatively, the piezoelectric element 160 and the piezoelectric element 210 may be manufactured from different materials. In this instance, the piezoelectric element 160 may be configured to be a piezoelectric element suitable for the operation of ejecting the liquid, and the piezoelectric element 210 may be configured to be a piezoelectric element suitable for absorbing vibration and detecting the pressure of the liquid in the absorbing chamber 13.

In Embodiment 1, the example in which, in the piezoelectric element 160 of the actuator 150, the second electrode 170 serving as a common electrode is arranged on the piezoelectric body 175 and the first electrode 165 serving as an individual electrode is arranged under the piezoelectric body 175 is described. However, the individual electrode may be arranged on the piezoelectric body 175 and the common electrode may be arranged under the piezoelectric body 175.

The present disclosure is not limited to the above embodiments and may be embodied with various configurations without departing from the spirit thereof. For example, the technical features of the embodiments corresponding to the technical feature in the aspects described in the summary may be replaced or combined as appropriate to solve a part or all of the problems or to achieve a part or all of the effects. The technical features may be eliminated as appropriate unless described as essential features in this specification.

C. Other Aspects (1) According to a first aspect of the disclosure, a liquid ejecting apparatus is provided. The liquid ejecting apparatus includes: a channel substrate having one or more pressure chambers that constitute a channel for a liquid, at least one absorbing chamber that is coupled to the pressure chamber, constitutes the channel for the liquid together with the pressure chamber, and absorbs vibration of the liquid propagated from the pressure chamber, and a nozzle that is coupled to the pressure chamber and ejects the liquid; a vibration plate that is stacked on the channel substrate at a position overlapping the pressure chamber and at a position overlapping the absorbing chamber when viewed in a stacking direction; a first piezoelectric element that is provided on a first surface, which is one surface of the vibration plate on a side opposite to a side on which the pressure chamber is present, at a position overlapping the pressure chamber when viewed in the stacking direction and that vibrates the vibration plate to apply pressure to the liquid in the pressure chamber; a second piezoelectric element that is provided on the first surface of the vibration plate at a position overlapping the absorbing chamber when viewed in the stacking direction and that deforms to absorb at least some of the vibration of the liquid propagated from the pressure chamber; and a pressure detecting section that detects, based on an electromotive force of the second piezoelectric element, pressure of the liquid in the absorbing chamber.

According to the above aspect, it is possible to detect a change in pressure in the absorbing chamber from a change in electromotive force generated by the second piezoelectric element different from the first piezoelectric element that applies pressure to the liquid in the pressure chamber. As a result, it is possible to detect a change in pressure of the liquid near the pressure chamber of an ejection section when the ejection section is driven for liquid ejection.

(2) In the liquid ejecting apparatus of the above aspect, the one or more pressure chambers may include a plurality of pressure chambers, and the at least one absorbing chamber may be provided in common to the plurality of pressure chambers.

According to such an aspect, a change in pressure of the liquid in the common absorbing chamber, which is propagated from the plurality of pressure chambers, is detected. As a result, it is possible to achieve a simple configuration for detecting a change in pressure of the liquid, compared with an instance in which a change in pressure of the liquid in the individual pressure chamber is detected.

(3) In the liquid ejecting apparatus of the above aspect, the first piezoelectric element may include a first electrode, a second electrode provided at a position farther than the first electrode from the vibration plate, and a first piezoelectric body provided between the first electrode and the second electrode in the stacking direction, and the second piezoelectric element may include a third electrode, a fourth electrode provided at a position farther than the third electrode from the vibration plate in the stacking direction, and a second piezoelectric body provided between the third electrode and the fourth electrode in the stacking direction.

According to such an aspect, since the first electrode of the first piezoelectric element, which is provided for each pressure chamber, is arranged at a position close to the vibration plate, a piezoelectric strain of the first piezoelectric element is able to be efficiently propagated to the vibration plate.

(4) In the liquid ejecting apparatus of the above aspect, the absorbing chamber may include a first region and a second region when the absorbing chamber is viewed in the stacking direction, and a thickness of the piezoelectric body overlapping the first region when viewed in the stacking direction may be thinner than a thickness of the piezoelectric body overlapping the second region when viewed in the stacking direction.

According to such an aspect, in the region in which the piezoelectric body overlaps the absorbing chamber, since the first region in which the piezoelectric body is formed to be thin is provided, it is possible to increase a bending amount of the piezoelectric body compared with an instance in which the piezoelectric body has a uniform thickness. As a result, it is possible to improve the function of absorbing the vibration of the liquid propagated from the pressure chamber.

(5) In the liquid ejecting apparatus of the above aspect, the absorbing chamber may include a first region and a second region when the absorbing chamber is viewed in the stacking direction, and the piezoelectric body may overlap the second region but may not overlap the first region when viewed in the stacking direction.

According to such an aspect, since the first region in which no piezoelectric body is formed and the second region in which the piezoelectric body is formed are provided, it is possible to increase a bending amount of the piezoelectric body compared with an instance in which the piezoelectric body has a uniform thickness. As a result, it is possible to improve the function of absorbing the vibration of the liquid propagated from the pressure chamber.

(6) In the liquid ejecting apparatus of the above aspect, the absorbing chamber may be formed as a space having a longitudinal direction in a first direction, the pressure chamber may be formed as a space having a longitudinal direction in a second direction intersecting the first direction and the stacking direction, and in the second piezoelectric element, the second region may include a portion formed to be continuous from a position corresponding to one end of the absorbing chamber in the second direction to a position corresponding to an other end thereof.

Since displacement of the absorbing chamber in the second direction serving as the transverse direction is larger than that in the first direction serving as the longitudinal direction, when the second region includes the portion formed to be continuous in the second direction, stress applied to the piezoelectric body is dispersed, making it possible to efficiently absorb the vibration of the liquid propagated from the pressure chamber.

(7) In the liquid ejecting apparatus of the above aspect, in a region overlapping the absorbing chamber when viewed in the stacking direction, the third electrode and the fourth electrode may be formed to be continuous from a position corresponding to the one end of the absorbing chamber in the second direction to a position corresponding to the other end thereof.

Since displacement of the absorbing chamber in the second direction serving as the transverse direction is larger than that in the first direction serving as the longitudinal direction, when the third electrode and the fourth electrode are formed to be continuous in the second direction, it is possible to detect a larger electromotive force and improve the accuracy in detecting pressure.

(8) The liquid ejecting apparatus of the above aspect may further include: a group of first driving wires that is a wire group coupled to the first electrode and that includes a plurality of first driving wires extending in a second direction intersecting a first direction in which the plurality of pressure chambers are arrayed and the stacking direction; at least one second driving wire coupled to the second electrode; a drive section that supplies a first driving signal to the first electrode via a first driving wire and sets the second electrode to a reference potential via the second driving wire; and a first detecting wire by which the third electrode and the pressure detecting section are coupled, in which the second driving wire may be arranged between the group of first driving wires and the first detecting wire in the first direction.

According to such an aspect, since the second driving wire from which noise is less likely to be generated compared with the group of first driving wires is arranged between the group of first driving wires from which noise is likely to be generated and the first detecting wire, the group of first driving wires and the first detecting wire are physically kept apart from each other. As a result, it is possible to reduce the influence of noise, which is generated by the group of first driving wires, on the first detecting wire.

(9) The liquid ejecting apparatus of the above aspect may further include a second detecting wire by which the fourth electrode and the pressure detecting section are coupled, in which the second driving wire may be arranged between the group of first driving wires and the second detecting wire.

According to such an aspect, since the second driving wire from which noise is less likely to be generated compared with the group of first driving wires is arranged between the group of first driving wires from which noise is likely to be generated and the second detecting wire, the group of first driving wires and the second detecting wire are physically kept apart from each other. As a result, it is possible to reduce the influence of noise, which is generated by the group of first driving wires, on the second detecting wire.

(10) In the liquid ejecting apparatus of the above aspect, the first piezoelectric body and the second piezoelectric body may be formed as a continuous piezoelectric body.

According to such an aspect, since the first piezoelectric body and the second piezoelectric body are integrally formed, it is possible to reduce the time and effort for forming a piezoelectric body compared with an instance in which the first piezoelectric body and the second piezoelectric body are separately formed.

(11) The liquid ejecting apparatus of the above aspect may further include a control section that drives the first piezoelectric element and the second piezoelectric element, in which the control section may simultaneously perform an ejecting operation of applying pressure to the liquid in the pressure chamber to cause the liquid to be ejected from the nozzle by driving the first piezoelectric element, and a detecting operation of detecting, from an electromotive force of the second piezoelectric element, pressure of the liquid in the absorbing chamber.

According to such an aspect, it is possible to simultaneously perform the operation of ejecting the liquid during printing and the operation of detecting pressure of the liquid in the absorbing chamber, and thus the operation of ejecting the liquid does not need to be stopped for performing the operation of detecting pressure. As a result, it is possible to shorten a waiting time in a printing operation.

The disclosure is not limited to the aspects of the liquid ejecting apparatus described above and can be realized in various aspects, such as a liquid ejecting system and a multifunctional peripheral including a liquid ejecting apparatus.

What is claimed is:

1. A liquid ejecting apparatus comprising:

a channel substrate having one or more pressure chambers that constitute a channel for a liquid, at least one absorbing chamber that is coupled to the pressure chamber, constitutes the channel for the liquid together with the pressure chamber, and absorbs vibration of the liquid propagated from the pressure chamber, and a nozzle that is coupled to the pressure chamber and ejects the liquid;

a vibration plate that is stacked on the channel substrate at a position overlapping the pressure chamber and at a position overlapping the absorbing chamber when viewed in a stacking direction;

a first piezoelectric element that is provided on a first surface, which is one surface of the vibration plate on a side opposite to a side on which the pressure chamber is present, at a position overlapping the pressure chamber when viewed in the stacking direction and that vibrates the vibration plate to apply pressure to the liquid in the pressure chamber;

a second piezoelectric element that is provided on the first surface of the vibration plate at a position overlapping the absorbing chamber when viewed in the stacking direction and that deforms to absorb at least some of the vibration of the liquid propagated from the pressure chamber; and a pressure detecting section that detects, based on an electromotive force of the second piezoelectric element, pressure of the liquid in the absorbing chamber.

2. The liquid ejecting apparatus according to claim 1, wherein the one or more pressure chambers include a plurality of pressure chambers, and the at least one absorbing chamber is provided in common to the plurality of pressure chambers.

3. The liquid ejecting apparatus according to claim 2, wherein the first piezoelectric element includes a first electrode, a second electrode provided at a position farther than the first electrode from the vibration plate, and a first piezoelectric body provided between the first electrode and the second electrode in the stacking direction, and the second piezoelectric element includes a third electrode, a fourth electrode provided at a position farther than the third electrode from the vibration plate in the stacking direction, and a second piezoelectric body provided between the third electrode and the fourth electrode in the stacking direction.

4. The liquid ejecting apparatus according to claim 3, wherein the absorbing chamber includes a first region and a second region when the absorbing chamber is viewed in the stacking direction, and a thickness of the piezoelectric body overlapping the first region when viewed in the stacking direction is thinner than a thickness of the piezoelectric body overlapping the second region when viewed in the stacking direction.

5. The liquid ejecting apparatus according to claim 4, wherein the absorbing chamber is formed as a space having a longitudinal direction in a first direction, the pressure chamber is formed as a space having a longitudinal direction in a second direction intersecting the first direction and the stacking direction, and in the second piezoelectric element, the second region includes a portion formed to be continuous from a position corresponding to one end of the absorbing chamber in the second direction to a position corresponding to an other end thereof.

6. The liquid ejecting apparatus according to claim 5, wherein in a region overlapping the absorbing chamber when viewed in the stacking direction, the third electrode and the fourth electrode are formed to be continuous from a position corresponding to the one end of the absorbing chamber in the second direction to a position corresponding to the other end thereof.

7. The liquid ejecting apparatus according to claim 3, wherein the absorbing chamber includes a first region and a second region when the absorbing chamber is viewed in the stacking direction, and the piezoelectric body overlaps the second region but does not overlap the first region when viewed in the stacking direction.

8. The liquid ejecting apparatus according to claim 3, further comprising:

a group of first driving wires that is a wire group coupled to the first electrode and that includes a plurality of first driving wires extending in a second direction intersecting a first direction in which the plurality of pressure chambers are arrayed and the stacking direction;

at least one second driving wire coupled to the second electrode;

a drive section that supplies a first driving signal to the first electrode via a first driving wire and sets the second electrode to a reference potential via the second driving wire; and a first detecting wire by which the third electrode and the pressure detecting section are coupled, wherein the second driving wire is arranged between the group of first driving wires and the first detecting wire in the first direction.

9. The liquid ejecting apparatus according to claim 8, further comprising a second detecting wire by which the fourth electrode and the pressure detecting section are coupled, wherein the second driving wire is arranged between the group of first driving wires and the second detecting wire.

10. The liquid ejecting apparatus according to claim 3, wherein the first piezoelectric body and the second piezoelectric body are formed as a continuous piezoelectric body.

11. The liquid ejecting apparatus according to claim 1, further comprising a control section that drives the first piezoelectric element and the second piezoelectric element, wherein the control section simultaneously performs an ejecting operation of applying pressure to the liquid in the pressure chamber to cause the liquid to be ejected from the nozzle by driving the first piezoelectric element, and a detecting operation of detecting, from an electromotive force of the second piezoelectric element, pressure of the liquid in the absorbing chamber.

* * * * *